United States Patent
Mooney et al.

(10) Patent No.: US 8,135,816 B2
(45) Date of Patent: Mar. 13, 2012

(54) COORDINATING RENDEZVOUS OF MULTIPLE VIRTUAL USERS ACROSS MULTIPLE DISTRIBUTED DEVICES

(75) Inventors: Kevin Mooney, Raleigh, NC (US); Kent D. Siefkes, Raleigh, NC (US); James P. Sutton, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 12/045,833

(22) Filed: Mar. 11, 2008

(65) Prior Publication Data

US 2009/0235117 A1    Sep. 17, 2009

(51) Int. Cl.
*G06F 15/173* (2006.01)

(52) U.S. Cl. .................................................. 709/223

(58) Field of Classification Search .................. 709/223, 709/224, 225
See application file for complete search history.

(56) References Cited

U.S. PATENT DOCUMENTS

| | | | | |
|---|---|---|---|---|
| 6,477,483 | B1 * | 11/2002 | Scarlat et al. ................. | 702/186 |
| 6,799,213 | B1 * | 9/2004 | Zhao et al. ..................... | 709/224 |
| 2007/0211697 | A1 * | 9/2007 | Noble ............................ | 370/352 |

OTHER PUBLICATIONS

Rational TestManager User's Guide; Version: 2003.06.00; Part No. 800-026180-000; Windows/UNIX; 36 pages.

* cited by examiner

*Primary Examiner* — Adnan Mirza
(74) *Attorney, Agent, or Firm* — Brian J. Teague

(57) ABSTRACT

The present invention provides the ability to synchronize or rendezvous multiple virtual users across multiple distributed devices in a load testing tool with reduced network message exchange between devices.

18 Claims, 4 Drawing Sheets

COORDINATING RENDEZVOUS OF MULTIPLE VIRTUAL USERS ACROSS MULTIPLE DISTRIBUTED DEVICES

BACKGROUND

The present invention relates to a multi-user load testing and performance testing tool for validating scalability of, for example, Web-based applications.

Load testing systems and software provide the ability to apply load or stress on a system by emulating a large number of users (herein termed "virtual users") using one or more computers (herein termed "driving computers" or "driving devices"). Each virtual user performs a sequence of tasks that result in a load or stress on the system being tested. Such load testing often involves coordinating the workload of the driving computers and the virtual users to place the desired stress on the system. For example, the workload of a large number of virtual users may need to be coordinated to simulate typical customer usage during peak hours or holidays. The load driving computers are typically coordinated by a master computer (herein termed a "controlling computer" or "controlling device").

One typical feature of load testing software is the ability to synchronize or rendezvous virtual users. One example usage is when it is desired to have all virtual users performing precisely the same task, and thus applying the desired load on the system under test, at the same time. When a rendezvous point is defined within a sequence of load testing tasks to be performed by the virtual users, the virtual users perform the load testing tasks until the rendezvous point is reached and then stop performing the tasks. In response to all of the virtual users having reached the rendezvous point (i.e., having performed all of the tasks preceding the rendezvous point), the virtual users then continue performing the tasks from the rendezvous point on.

A common point in the workload to place a rendezvous point is after the virtual users have logged into the system under test. Because the system under test may not be able to simultaneously log in hundreds or thousands of virtual users, the login process is often staggered over a period of time suitable to the system under test. It is often desirable, therefore, to begin coordinated load once the login process has been completed by all virtual users and a rendezvous point may be used to accomplish this goal.

Known load testing systems and methods achieve rendezvous by having each virtual user announce arrival at the rendezvous point by sending a message via a computer network to the controlling computer. After the controlling computer determines that all virtual users have announced arrival, the controlling computer then sends a message to each virtual user releasing them from the rendezvous point (i.e., instructing the virtual users to continue performing the tasks). While this technique meets the requirements for synchronization, the technique requires a great deal of network traffic and CPU (central processing unit) load on the controlling computer to process the arrival and release of each virtual user individually. For example, if one thousand virtual users participated in the rendezvous point, there would be one thousand network messages for arrival and another one thousand network messages for release.

BRIEF SUMMARY

The present invention may provide the ability to synchronize or rendezvous multiple virtual users across multiple distributed devices in a load testing tool with reduced network message exchange between devices and reduced CPU processing on the controlling computer.

In one embodiment of the invention, a method, by a driving device, of applying a desired load to a system under test comprises emulating a plurality of virtual users, each virtual user in communication with a system under test and configured to perform a sequence of load testing tasks to apply a desired load to the system under test. Each virtual user performs the load testing tasks until a predetermined rendezvous point is reached and stops performing the load testing tasks in response to reaching the predetermined rendezvous point. The driving device determines if all respective virtual users have reached the predetermined rendezvous point. If the driving device comprises the only one driving device, the driving device releases, in response to determining that all respective virtual users have reached the predetermined rendezvous point, the virtual users to continue performing the load testing tasks. If the driving device comprises one of more than one driving device, the driving device: notifies, in response to determining that all respective virtual users have reached the predetermined rendezvous point, a controlling device that all respective virtual users have reached the predetermined rendezvous point; receives from the controlling device, in response to a determination by the controlling device that all driving devices have notified the controlling device, a notification to release the virtual users to continue performing the load testing tasks; and releases, in response to receiving the notification, the virtual users to continue performing the load testing tasks.

In another embodiment of the invention, a method, by a controlling device, of controlling an application of a desired load to a system under test comprises notifying one or more driving devices of a total number of virtual users to be emulated by each driving device, each virtual user in communication with a system under test and configured to perform a sequence of load testing tasks to apply a desired load to the system under test. If the one or more driving devices comprise only one driving device, the controlling device notifies the driving device that the driving device comprises the only one driving device. If the one or more driving devices comprise more than one driving device, the controlling device: receives a notification from each driving device in response to a determination by each driving device that all respective virtual users have reached a predetermined rendezvous point and have stopped performing the load testing tasks in response to reaching the predetermined rendezvous point; determines if a notification has been received from each driving device; and notifies each driving device, in response to determining that a notification has been received from each driving device, to release all respective virtual users to continue performing the load testing tasks.

In addition to the method, by a driving device, of applying a desired load to a system under test, as described above, other aspects of the present invention are directed to corresponding systems and computer program products for applying, by a driving device, a desired load to a system under test. Further, in addition to the method, by a controlling device, of controlling an application of a desired load to a system under test as described above, other aspects of the present invention are directed to corresponding systems and computer program products for controlling, by a controlling device, an application of a desired load to a system under test.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1A:
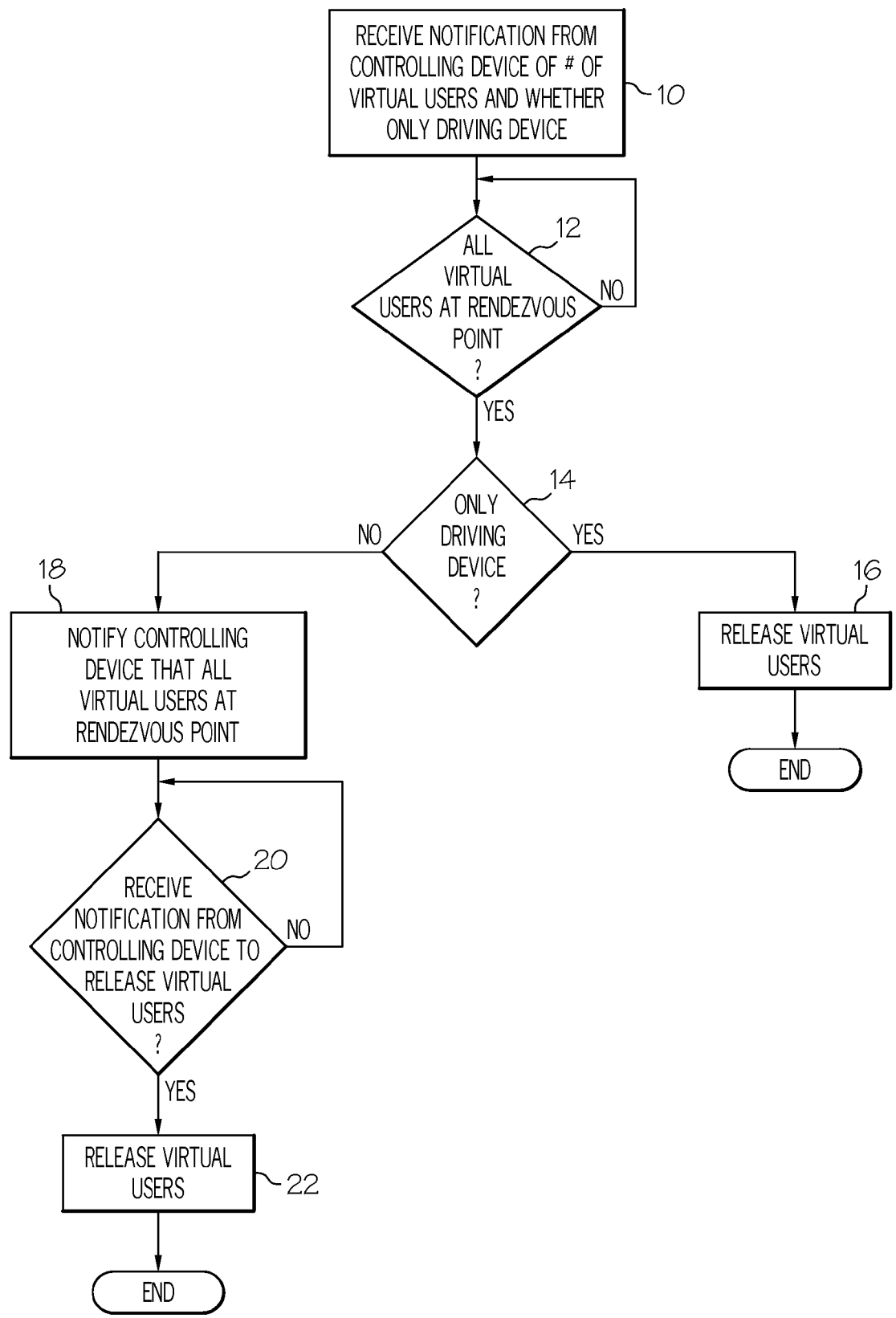
FIGS. 1A and 1B are flowcharts of the operation of a method for coordinating rendezvous of multiple virtual users across multiple distributed devices, in accordance with one embodiment of the present invention.

A load testing tool may provide the ability to coordinate the activities of the multiple virtual users the tool creates in order to produce load on the system under test. A rendezvous point may be used to define a place in the sequence of tasks where virtual users rendezvous. After all the virtual users participating in the load test have reached this rendezvous point, the load testing tool releases them so they may continue providing load to the system under test. A complicating aspect of providing load testing with hundreds or thousands of virtual users is having sufficient computing resources for this task. In cases where one computer is insufficient, a load testing tool may provide the capability to use many separate driving computers to drive the load. In these cases, the virtual users are spread out over many computers. A single, coordinating controlling computer is used to oversee the load test.

While embodiments of the invention are described herein in conjunction with load testing, embodiments of the invention may be used for any purpose in which it is desirable to synchronize tasks distributed over multiple computers.

Each driving computer may emulate a different number of virtual users. By carefully examining the workload, it is possible to determine for a given rendezvous point not only the total number of virtual users expected to arrive but also the number expected to arrive for each participating driving computer. This information enables two different operating scenarios. First, in the case where multiple driving computers have participating virtual users, the number of expected virtual users to be emulated by each driving computer is communicated to each driving computer by the controlling computer. With this information, each driving computer can determine if all its virtual users have arrived at the rendezvous point. Upon arrival of its last expected virtual user, each driving computer sends one "all my virtual users have arrived" message to the controlling computer. After the controlling computer has received an "all my virtual users have arrived" message from each participating driving computer, the controlling computer can then send each driving computer a "release" message instructing each driving computer to release its respective virtual users from the rendezvous point such that the virtual users continue performing the workload from the rendezvous point forward. In this case, the number of messages traveling over the network has been reduced from two messages per virtual user to two messages per driving computer, thus greatly improving the speed and efficiency of execution of the rendezvous point.

In a second scenario, if a particular driving computer happens to be the only computer hosting virtual users that are to participate in a given synchronization, then that driving computer may have complete autonomy to determine arrival of all participating virtual users at the rendezvous point and to release the virtual users to continue. In this case, there is no need for coordination on the part of the controlling computer and no network traffic is required in the execution of the rendezvous point.

The result is full rendezvous of all virtual users across distributed devices with reduced network message exchange between devices and proportionally reduced CPU processing on the controlling computer. Accordingly, an embodiment of the present invention can reduce the amount of network traffic and CPU processing on the controlling computer required to satisfy the requirements of synchronization. An embodiment of the invention can reduce latency of the rendezvous point, that is, reduce the time from when the last virtual user arrived at the rendezvous point to the time when all of the virtual users have been released. Ideally, this time would be zero—it is desirable for all virtual users to release "simultaneously," at least within the ability of the multi-processor computing systems.

Figure 1B:
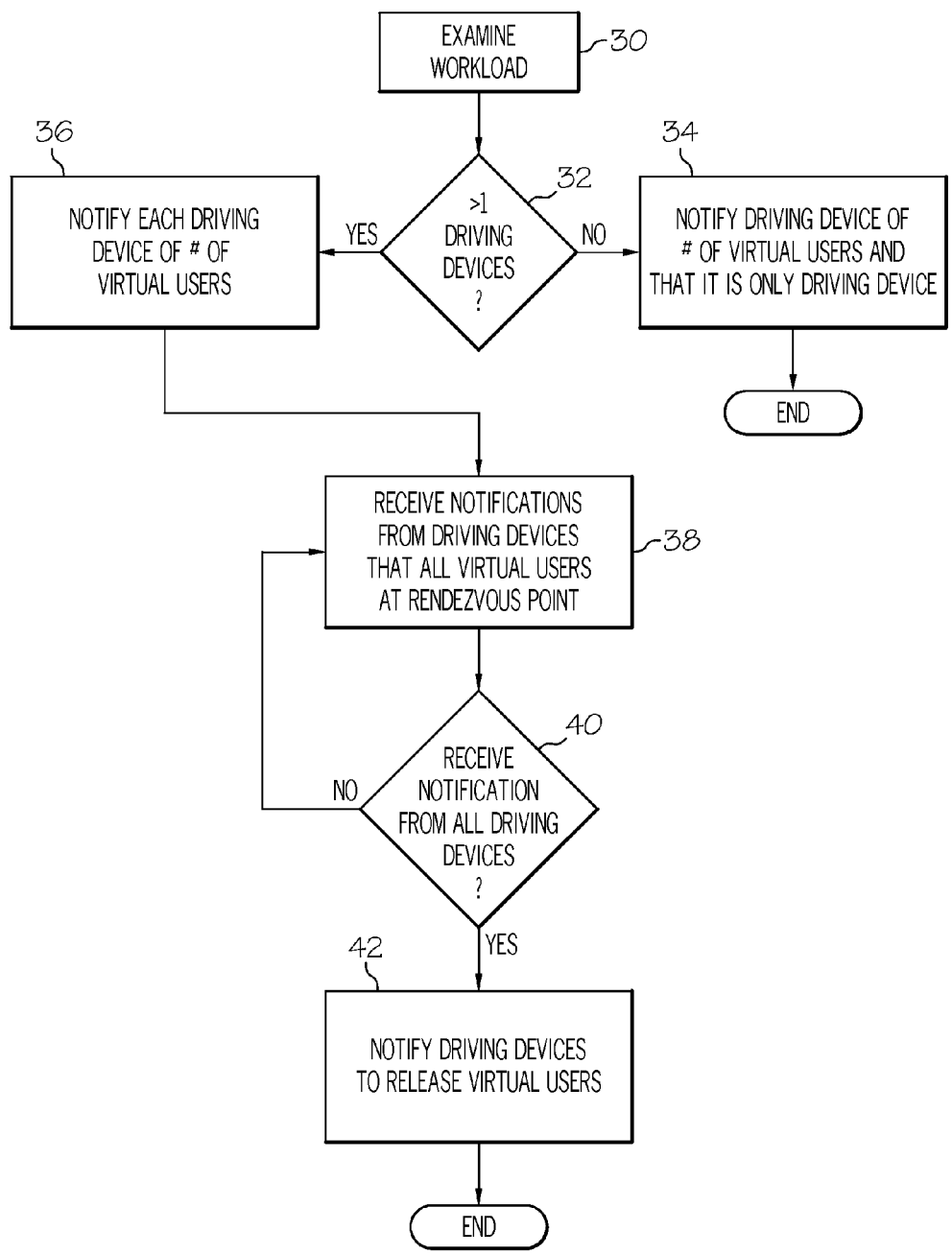

Referring now to FIGS. 1A and 1B, the operation of a method for coordinating rendezvous of multiple virtual users across multiple distributed devices is illustrated in accordance with an exemplary embodiment of the present invention. FIG. 1A illustrates the actions taken by or occurring in each driving device, and FIG. 1B illustrates the actions taken by or occurring in the controlling device. In FIG. 1A, each driving device receives notification from the controlling device of the number of virtual users to be emulated in each driving device and whether the driving device is the only driving device that will be emulating virtual users (block 10). The virtual users on each driving device will begin performing the sequence of load testing tasks, and will stop performing the tasks when the rendezvous point is reached. Each driving device determines if all virtual users have reached the rendezvous point (block 12). If all virtual users have reached the rendezvous point, the next step depends on whether the particular driving device is the only driving device that is emulating virtual users (i.e., whether there is one or more than one driving devices) (block 14). If the particular driving device is the only driving device that is emulating virtual users, the driving device instructs the virtual users to continue performing the tasks from the rendezvous point forward (block 16) (assuming that the driving device has determined in block 12 that all virtual users have reached the rendezvous point). If there is more than one driving device (i.e., if the particular driving device is not the only driving device that is emulating virtual users, each driving device notifies the controlling device that all its virtual users have reached the rendezvous point (block 18) (assuming that each driving device has determined in block 12 that all its virtual users have reached the rendezvous point). Each driving device then waits to receive notification from the controlling device to release its respective virtual users. If the driving device receives notification (block 20), the driving device releases its respective virtual users (block 22).

In FIG. 1B, the controlling device examines the workload to determine, for example, the number of driving devices that will be emulating virtual users as well as the total number of virtual users for each driving device (block 30). If there is only one driving device, that one driving device has autonomy to release the virtual users from the rendezvous point. As such, if it is determined at block 32 that there is only one driving device, the controlling device notifies the one driving device of the number of virtual to be emulated by the one driving device and that the driving device is the only driving device (block 34). The activities of the controlling device are then finished. If it is determined at block 32 that there is more than one driving device, the controlling device notifies each driving device of the number of virtual users to be emulated in each driving device (block 36). As illustrated in FIG. 1A, the virtual users on each driving device begin performing the sequence of load testing tasks, and stop performing the tasks when the rendezvous point is reached. Each driving device determines if all virtual users have reached the rendezvous point and, if there is more than one driving device, each driving device notifies the controlling device that all its virtual users have reached the rendezvous point. The controlling device receives these notifications from the driving devices at block 38, and determines at block 40 if notifications have been received from all driving devices. If notifications have not been received from all driving devices, the controlling device continues to receive notifications until such time as notifications have been received from all driving devices. In response to receiving notifications from all driving devices (as determined at block 40), the controlling device notifies all driving devices to release the virtual users to continue performing the tasks from the rendezvous point forward (block 42).

Figure 2:
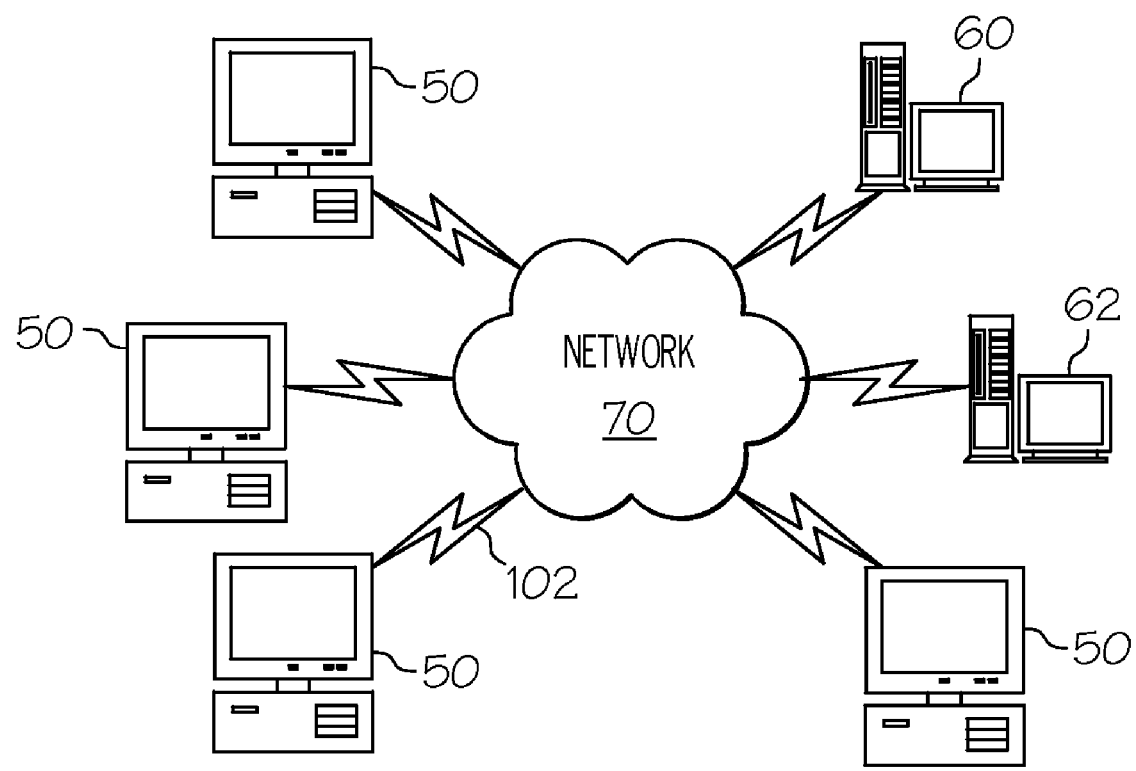
FIG. 2 is a schematic block diagram of a computer network in which embodiments of the present invention may operate.

FIG. 2 is a schematic block diagram of a computer network in which embodiments of the present invention may operate. Driving computers 50 and controlling computer 60 provide processing, storage, and input/output devices executing application programs and the like. Driving computers 50 may be linked through communications network 70 to other computing devices, including controlling computer 60 and Web server computer 62. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In the system of FIG. 2, Web server computer 62 is the system under test, driving computers 50 are emulating virtual users to load test Web server computer 62, and controlling computer 60 coordinates the activities of the driving computers 50. In other embodiments of the present invention, driving computers 50 and controlling computer 60 may be linked over any suitable communication network.

Figure 3:
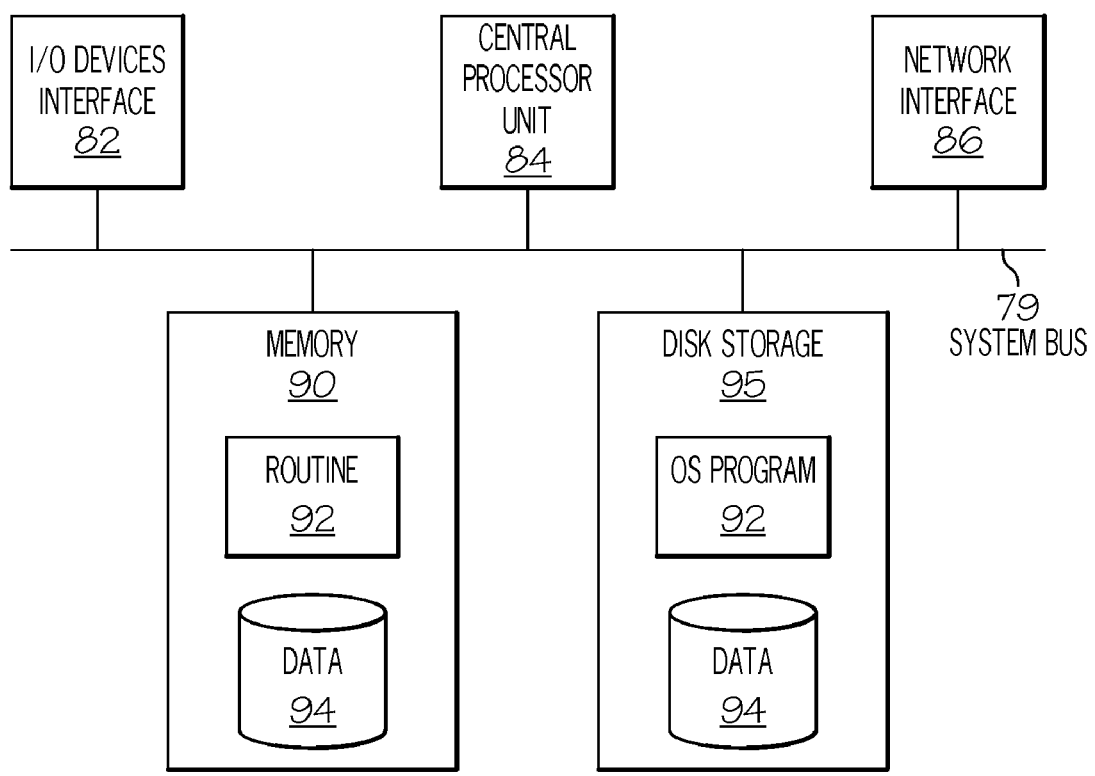
FIG. 3 is a schematic block diagram of a computer in the network of FIG. 2.

FIG. 3 is a diagram of the internal structure of a computer (e.g., driving computers 50 or controlling computer 60) in the computer network of FIG. 2. Each computer typically contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 2). Memory 90 provides volatile storage for computer software instructions used to implement an embodiment of the present invention. Disk storage 95 provides non-volatile storage for computer software instructions and data used to implement an embodiment of the present invention. Central processor unit 84 is also attached to system bus 79 and provides for the execution of computer instructions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A method, by a driving device, of applying a desired load to a system under test, the method comprising:
emulating a plurality of virtual users, each virtual user in communication with a system under test and configured to perform a sequence of load testing tasks to apply a desired load to the system under test;
performing, by each virtual user, the load testing tasks until a predetermined rendezvous point is reached and stopping the performing of the load testing tasks in response to reaching the predetermined rendezvous point;
determining if all respective virtual users have reached the predetermined rendezvous point;
wherein if the driving device comprises the only one driving device:
in response to determining that all respective virtual users have reached the predetermined rendezvous point, releasing the virtual users to continue performing the load testing tasks;
wherein if the driving device comprises one of more than one driving device:
in response to determining that all respective virtual users have reached the predetermined rendezvous point, notifying a controlling device that all respective virtual users have reached the predetermined rendezvous point;
in response to a determination by the controlling device that all driving devices have notified the controlling device, receiving from the controlling device a notification to release the virtual users to continue performing the load testing tasks; and
in response to receiving the notification, releasing the virtual users to continue performing the load testing tasks.

2. The method of claim 1, wherein the controlling device and the driving device each comprise a computer.

3. The method of claim 1, further comprising:
receiving, from the controlling device, a notification of a total number of virtual users to be emulated by the driving device.

4. The method of claim 1, further comprising:
if the driving device comprises the only one driving device, receiving, from the controlling device, a notification that the driving device comprises the only one driving device.

5. A system for applying a desired load to a system under test, the system comprising:
a driving device in communication with a controlling device, the driving device configured to emulate a plurality of virtual users, each virtual user in communication with a system under test and configured to perform a sequence of load testing tasks to apply a desired load to the system under test;
wherein each virtual user is configured to perform the load testing tasks until a predetermined rendezvous point is reached and stopping the performing of the load testing tasks in response to reaching the predetermined rendezvous point;
wherein the driving device is configured to determine if all respective virtual users have reached the predetermined rendezvous point;
wherein, if the driving device comprises the only one driving device, the driving device is configured, in response to determining that all respective virtual users have reached the predetermined rendezvous point, to release the virtual users to continue the performing load testing tasks;
wherein, if the driving device comprises one of more than one driving device, the driving devices is configured, in response to determining that all respective virtual users have reached the predetermined rendezvous point, to notify the controlling device that all respective virtual users have reached the predetermined rendezvous point; the driving device is configured to receive from the controlling device, in response to a determination by the controlling device that all driving devices have notified the controlling device, a notification to release the virtual users to continue performing the load testing tasks; and the driving device is configured to, in response to receiving the notification, to release the virtual users to continue performing the load testing tasks.

6. The system of claim 5, wherein the controlling device and the driving device each comprise a computer.

7. The system of claim 5, wherein the driving device is further configured to receive a notification from the controlling device of a total number of virtual users to be emulated by the driving device.

8. The system of claim 5, wherein, if the driving device comprises the only one driving device, the driving device is further configured to receive a notification from the controlling device that the driving device comprises the only one driving device.

9. A computer program product for applying, by a driving device, a desired load to a system under test, the computer program product comprising at least one computer-readable storage device having computer-readable program code stored therein, the computer-readable program code comprising:
computer-usable program code for emulating a plurality of virtual users, each virtual user in communication with a system under test;
computer-usable program code for performing a sequence of load testing tasks by each virtual user to apply a desired load to the system under test;
computer-usable program code for performing, by each virtual user, the load testing tasks until a predetermined rendezvous point is reached and stopping the performing of the load testing tasks in response to reaching the predetermined rendezvous point;
computer-usable program code for determining if all respective virtual users have reached the predetermined rendezvous point;
computer-usable program code for, if the driving device comprises the only one driving device:
releasing, in response to determining that all respective virtual users have reached the predetermined rendezvous point, the virtual users to continue the performing load testing tasks;
computer-usable program code for, if the driving device comprises one of more than one driving device:
notifying, in response to determining that all respective virtual users have reached the predetermined rendezvous point, a controlling device that all respective virtual users have reached the predetermined rendezvous point;
receiving from the controlling device, in response to a determination by the controlling device that all driving devices have notified the controlling device, a notification to release the virtual users to continue performing the load testing tasks; and
releasing, in response to receiving the notification, the virtual users to continue performing the load testing tasks.

10. The computer program product of claim 9, wherein the controlling device and the driving device each comprise a computer.

11. The computer program product of claim 9, further comprising:
computer-usable program code for receiving, from the controlling device, a notification of a total number of virtual users to be emulated by the driving device.

12. The computer program product of claim 9, further comprising:
computer-usable program code for, if the driving device comprises the only one driving device, receiving, from the controlling device, a notification that the driving device comprises the only one driving device.

13. A method, by a controlling device, of controlling an application of a desired load to a system under test, the method comprising:
notifying one or more driving devices of a total number of virtual users to be emulated by each driving device, each virtual user in communication with a system under test and configured to perform a sequence of load testing tasks to apply a desired load to the system under test;
if the one or more driving devices comprise only one driving device:
notifying the driving device that the driving device comprises the only one driving device;
if the one or more driving devices comprise more than one driving device:
receiving a notification from each driving device in response to a determination by each driving device that all respective virtual users have reached a predetermined rendezvous point and have stopped performing the load testing tasks in response to reaching the predetermined rendezvous point; and
notifying each driving device, in response to determining that a notification has been received from each driving device, to release all respective virtual users to continue performing the load testing tasks.

14. The method of claim 13, wherein the controlling device and the driving device each comprise a computer.

15. A system for applying a desired load to a system under test, the system comprising:
a controlling device in communication with one or more driving devices, each driving device configured to emulate a plurality of virtual users, each virtual user in communication with a system under test and configured to perform a sequence of load testing tasks to apply a desired load to the system under test;
wherein the controlling device is configured to notify the one or more driving devices of a total number of virtual users to be emulated by each driving device;
wherein, if the one or more driving devices comprise only one driving device, the controlling device is configured to notify the driving device that the driving device comprises the only one driving device;
wherein, if the one or more driving devices comprise more than one driving device, the controlling device is configured to:
receive a notification from each driving device in response to a determination by each driving device that all respective virtual users have reached a predetermined rendezvous point and have stopped performing the load testing tasks in response to reaching the predetermined rendezvous point; and
notify each driving device, in response to determining that a notification has been received from each driving device, to release all respective virtual users to continue performing the load testing tasks.

16. The system of claim 15, wherein the controlling device and the driving device each comprise a computer.

17. A computer program product for controlling, by a controlling device, an application of a desired load to a system under test, the computer program product comprising at least one computer-readable storage device having computer-readable program code stored therein, the computer-readable program code comprising:

computer-usable program code for notifying one or more driving devices of a total number of virtual users to be emulated by each driving device, each virtual user in communication with a system under test and configured to perform a sequence of load testing tasks to apply a desired load to the system under test;

computer-usable program code for, if the one or more driving devices comprise only one driving device:
notifying the driving device that the driving device comprises the only one driving device;

computer-usable program code for, if the one or more driving devices comprise more than one driving device:
receiving a notification from each driving device in response to a determination by each driving device that all respective virtual users have reached a predetermined rendezvous point and have stopped performing the load testing tasks in response to reaching the predetermined rendezvous point; and
notifying each driving device, in response to determining that a notification has been received from each driving device, to release all respective virtual users to continue performing the load testing tasks.

18. The computer program product of claim 17, wherein the controlling device and the driving device each comprise a computer.

* * * * *